United States Patent
Alexander, Jr. et al.

(10) Patent No.: US 6,512,742 B1
(45) Date of Patent: Jan. 28, 2003

(54) SYSTEM FOR DATA TRANSMISSION ACROSS A LINK AGGREGATION

(75) Inventors: Cedell Adam Alexander, Jr., Durham, NC (US); Arush Kumar, Durham, NC (US); Loren Douglas Larsen, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/207,962

(22) Filed: Dec. 9, 1998

(51) Int. Cl.$^7$ ................................. G06F 7/14
(52) U.S. Cl. ............... 370/231; 370/235; 370/389; 711/216; 711/220; 711/221
(58) Field of Search ............... 370/231, 235, 370/252, 254, 392, 473, 468, 389, 537; 711/216, 220, 221

(56) References Cited

U.S. PATENT DOCUMENTS

| | | | |
|---|---|---|---|
| 4,032,719 A | 6/1977 | Blasbalg | 179/15 |
| 5,163,156 A | 11/1992 | Leung et al. | 395/800 |
| 5,430,729 A | 7/1995 | Rahnema | 270/94.1 |
| 5,524,111 A | 6/1996 | Le Pennec et al. | 370/84 |
| 5,687,168 A | 11/1997 | Iwata | 370/255 |

OTHER PUBLICATIONS

IBM Technical Disclosure Bulletin, vol. 38, no. 9, Sep. 1995, "Load Balancing for Multiple Interfaces for Transmission Control Protocol/Internet Protocol for VM/MVS."

IBM Technical Disclosure Bulletin, vol. 35, no. 5, Oct. 1992, "Guideline for Flow Window Configuration in Data Redistribution."

*Primary Examiner*—Steven Nguyen
*Assistant Examiner*—Duc Duong
(74) *Attorney, Agent, or Firm*—Gerald R. Woods; Bracewell & Patterson, L.L.P.

(57) ABSTRACT

A method and system are disclosed for balanced transmitting of data across a link aggregation of k links in a network, where k is not a power of 2, where data is specified by frames each having a source address and a destination address. N bits of the source address and N bits of the destination address are determined to be XORed together where N is greater than 2. An index table with $2^N$ entry positions is created where each of the entry positions is assigned an index number between 0 and $2^N-1$. The entry positions of the index table are filled with one link of the k links in each entry position by repetitively entering each of the k links until all of the entry positions are filled. The frames of data with identical source address and destination addresses as other frames of data are grouped into a flow. N bits of the source address are XORed together with N bits of the destination address for each flow to obtain an N bit index number for each flow. The index table is accessed with the N bit index number to identify a particular link within the index table. The flow is transmitted across the particular link.

19 Claims, 2 Drawing Sheets

| Index Number | 0 | 1 | 2 | ... | $2^N$-3 | $2^N$-2 | $2^N$-1 | ⟩ 46 |
|---|---|---|---|---|---|---|---|---|
| Distributed Links | 1... | .... | ...k | 1... | .... | ...k | $2^N$ mod k | ⟩ 48 |

⟨ 44

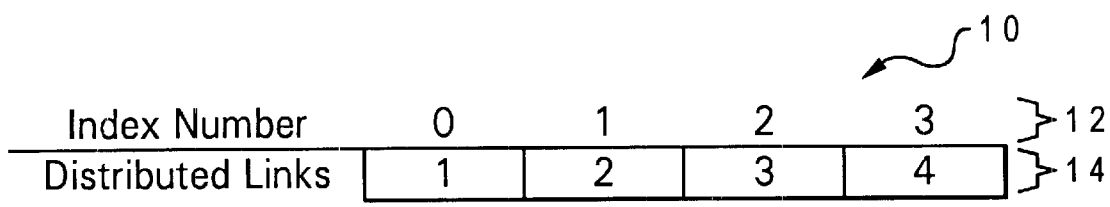
-Amended- *Fig. 1*
*Prior Art*
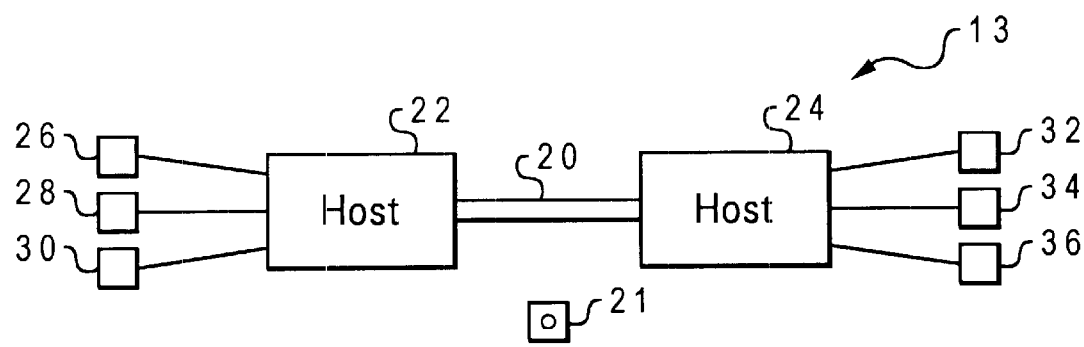
*Fig. 2*
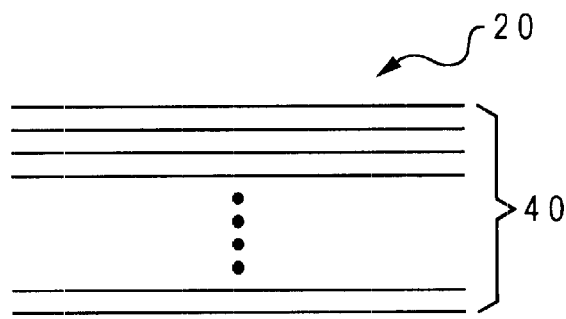
*Fig. 3*

| Index Number | 0 | 1 | 2 | ... | $2^N-3$ | $2^N-2$ | $2^N-1$ | $2^N \bmod k$ |
|---|---|---|---|---|---|---|---|---|
| Distributed Links | 1... | ... | ...k | 1... | ... | ...k | | |

$\overbrace{\phantom{xxxxxxxxxxxxxxxxxxxxxxxxxxxxxxxxxxxxxxx}}^{44}$ $\overbrace{\phantom{xx}}^{46}$ $\overbrace{\phantom{xx}}^{48}$

*Fig. 4*

| Index Number | 0 | 1 | 2 | 3 |
|---|---|---|---|---|
| Distributed Links | 1 | 2 | 3 | 1 |

$\overbrace{\phantom{xx}}^{52}$ , $\swarrow 50$

*Fig. 5*

| Index Number | 0 | 1 | 2 | 3 | 4 | 5 | 6 | 7 |
|---|---|---|---|---|---|---|---|---|
| Distributed Links | 1 | 2 | 3 | 1 | 2 | 3 | 1 | 2 |

$\swarrow 54$ $\overbrace{\phantom{xx}}^{56}$

*Fig. 6*

| Index Number | 0 | 1 | 2 | 3 | ... | 60 | 61 | 62 | 63 |
|---|---|---|---|---|---|---|---|---|---|
| Distributed Links | 1 | 2 | 3 | 1 | ... | 2 | 3 | 1 | 2 |

$\swarrow 58$ $\overbrace{\phantom{xx}}^{60}$

*Fig. 7*

SYSTEM FOR DATA TRANSMISSION ACROSS A LINK AGGREGATION

BACKGROUND OF THE INVENTION

1. Field of the Invention

The present invention relates in general to a method and system for improved transmission of data and in particular to an improved method and system for balanced data transmission across a link aggregation. Still more particularly, the present invention relates to an improved method and system for balanced distribution of the data for tranmission across k links of a link aggregation where k is not a power of 2.

2. Description of the Related Art

In a networking environment, it is typical that a plurality of devices will be linked together for the purpose of transmitting data from one device to another in the network. In a large network, it would be uneconomical to provide a specific data link connecting each device to each of the other devices in the network. In order to provide connectivity from each device to each of the other devices in the network in an efficient and economical manner, a plurality of methods have been developed.

One well known method of distributing data between devices within a network is through switches. Switches may be utilized within the network to receive data from a plurality of devices and distribute the data to a plurality of devices to reduce the amount of data lines required to distribute data. To utilize switches to communicate between devices, each device has a specific address. Specifically in an ethernet switching environment, each device in the network has a media access control (MAC) address, which uniquely identifies the device in the network. Frames of data are delivered to a MAC destination address (DA) and senders are recognized by a MAC source address (SA). Each switch, and each port on a switch supports a finite number of MAC addresses. Ideally, the overall number of MAC addresses distributed by a switch should be large, so the switch can support a large number of devices.

In addition to supporting a large number of devices, a switch should comprise the ability to handle transfer of large amounts of data through a network. For a switch to handle quick transfer of large amounts of data, often link aggregation is utilized in order to allow a switch to support a higher bandwidth interface to increase the rate of data transfer. Link aggregation is a technique that allows parallel physical links between switches or between a switch and a server to be used simultaneously, multiplying the bandwidth between the devices. Link aggregation may be further defined as a method of grouping physical link segments of the same media type and speed, and treating them as if they were part of a single, logical link segment. For example, two 100 Mbps links between switches may be grouped into a link aggregation and treated as a single 200 Mbps link to create a higher bandwidth interface between the two switches.

In order to optimize data transmission across a link aggregation, a load balancing scheme is preferably implemented. Load balancing schemes attempt to distribute data in a balanced manner across the links of the link aggregation in order to optimize the available bandwidth. One load balancing techniques may measure the bandwidth through each link and adjust data to move through underutilized links to reduce traffic through overutilized links. Other load balancing techniques may utilize less hardware through a table with a hashing scheme to distribute data for transmission across the link aggregation.

FIG. 1 depicts a prior art pictorial illustration of a table 10 which may be utilized to implement a hashing scheme. Table 10 contains $2^N$ entry positions where $2^N$ is the number of links in the link aggregation. In the example shown, N=2 such that there are four links the link aggregation and four entry positions in table 10. Each of the four entry positions has an assigned index number 0–3 as depicted at reference numeral 12. Following, each of the four links is assigned to one entry position of the table 10 as depicted at reference numeral 14. To distribute the data across the links, each of the data frames with identical MAC addresses as other data frames are grouped into a flow. N=2 bits of the SA of each flow are XORed with N=2 bits of the DA of each flow to create a two bit table address. The link which is addressed for a selected flow is selected from table 10 utilizing the table address described above and the flow is sent across the particular link. By the hashing scheme described above, each link should be assigned to onefourth of the flows. However, in order to implement this technique, the link aggregation must have k links where k is a power of two. Thus, table 10, utilized to implement the depicted hashing scheme, limits the link aggregation design.

As networking technologies require larger bandwidths for data transmission, users demand that networks scale flexibility to fit their needs. It would be desirable in the development of link aggregation to provide a table and a method of assigning links to that table which may be utilized with a hashing scheme which would support link aggregations of an arbitrary size, with balanced distribution of data transmission across the k links. Such a table and hashing scheme would not be limited to $2^N$ links, thus allowing flexibility in the number of links included in a link aggregation for expansion of the uses of a link aggregation.

SUMMARY OF THE INVENTION

It is therefore one object of the present invention to provide a method and system for improved data transmission.

It is another object of the present invention to provide an improved method and system for balanced data transmission across a link aggregation.

It is yet another object of the present invention to provide an improved method and system for balanced distribution of the data for transmission across k links of the link aggregation where k is not a power of 2.

The foregoing objects are achieved as is now described. A method and system are disclosed for balanced transmission of data across a link aggregation of k links in a network, where k is not a power of 2, where data is specified by frames each having a source address and a destination address. N bits of the source address and N bits of the destination address are selected to be XORed together, where N is greater than 2, where N is chosen to provide an equal distribution of data across each link within a desired percent. An index table with $2^N$ entry positions is created where each of the entry positions is assigned an index number between 0 and $2^N-1$. The entry positions within the index table are then filled with one link of the k links in each entry position until all of the entry positions are filled where the k links may fill the entry positions in a repetitive sequence. The frames of data with identical source addresses and destination addresses with other frames of data are grouped into a flow. N bits of the source address are XORed together with N bits of the destination address for each of flow to obtain an N bit index number for each of flow. The index table is then accessed with the N bit index number to identify a particular link within the index table. The flow is transmitted across the particular link.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

FIG. 1 is a pictorial illustration of a prior art method index table.

FIG. 2 is a high level block diagram of a link aggregation between two hosts for transmitting data between the hosts which may be utilized to implement the method and system of the present invention;

FIG. 3 is a more detailed diagram of a link aggregation which may be utilized to: implement the method and system of the present invention;

FIG. 4 is a pictorial illustration of a general $2^N$ entry position index table provided in accordance with the method and system of the present invention;

FIG. 5 is a pictorial illustration of a $2^N$ entry position index table where N=2 provided in accordance with the method and system of the present invention;

FIG. 6 is a pictorial illustration of a $2^N$ entry position index table where N=3 provided in accordance with the method and system of the present invention;

FIG. 7 is a pictorial illustration of a $2^N$ entry position index table where N=5 provided in accordance with the method and system of the present invention.

DESCRIPTION OF THE PREFERRED EMBODIMENT

With reference now to the figures and in particular with reference to FIG. 2, there is depicted a high level block diagram illustrating a network 18 which may be utilized to implement the method and system of the present invention. As illustrated, the network 18 may be constructed utilizing a link aggregation 20 for transmitting data between the hosts 22 and 24. Software which directs the implementation of a flow transmission controller of the present invention may be provided to host 22 and/or host 24 for storage in host 22 and/or host 24 via a variety of signal-bearing media which include, but are not limited to writeable storage media such as floppy diskette 21. Hosts 22 and 24 preferably include a permanent storage medium (not shown) such as read-only memory (ROM) for storing the software and a temporary storage medium (not shown) such as random access memory (RAM) for supporting the implementation of the software as will be further described.

In a preferred embodiment of the present invention a host 22 and 24 may be a switch, which may be an ethernet switch, or a host 22 and: 24 may be a server. Each of the hosts 22 and 24 is networked with a plurality of devices where host 22 is connected to devices 26, 28 and 30 and host 24 is connected to devices 32, 34 and 36. Those skilled in the art will appreciate that devices 26, 28, 30, 32, 34 and 36 may represent a plurality of devices which may be included in a network, including additional hosts, and the plurality of devices may be networked with other devices not shown in the present embodiment.

Referring now to FIG. 3, there is depicted a link aggregation 20 with k links as illustrated at reference numeral 40. It is preferable that each of the k links illustrated at reference numeral 40 has similar bandwidth properties, however not required. As previously described, it is desirable to be able to bundle a number of physical links together to form a link aggregation for optimizing bandwidth between switches. The k links illustrated at reference numeral 40 which are bundled into the link aggregation 20 appear as a MAC interface to higher layer protocols and thereby may be utilized with a plurality of networking protocols.

Still referring now to FIG. 3, the k links illustrated at reference numeral 40 are not restricted to contiguous physical numbering or starting with link number 1. For example, if k=4, the physical link numbers may be identified as links 1, 2, 3, 4 where the link numbers are contiguous and start with link number 1 or the link numbers may be identified as links 3, 5, 6, 12 where the link numbers are not contiguous. However, in both cases, there is a first link, a second link, a third link and a fourth link in the k=4 link aggregation 20 regardless of the actual link number. For purposes of illustration hereon, the links utilized are contiguous and start with a link number 1. However, each of the applications of links numbers may be implemented with non-contiguous numbers which may or may not start with link number 1.

With reference now to FIG. 4 there is depicted a pictorial illustration of a general $2^N$ entry position index table 44 provided in accordance with the method and system of the present invention:. A method of balancing data transmission across k links is utilized to create index table 44 depending on the k links as illustrated at reference numeral 40 included in a link aggregation 20. Additionally, the method of balancing data transmission across k links is utilized to distribute data across the k links in a balanced manner to optimize bandwidth whereby a hashing scheme may be utilized to access index table 44. Therefore, a flow transmission controller may be executed by the method of balancing data transmission in a host 22 or 24. The temporary storage medium provided in host 22 or 24 may be utilized to store index table 44 utilized by the flow transmission controller.

By the method of balancing data transmission depicted herein, index table 44 is created with $2^N$ entry positions addressed from 0 to $2^N-1$ as illustrated at reference number 46 where each address is an N bit number. An identification of each of the links is assigned to at least one entry position as depicted at reference number 48. In index table 44, the link numbers 1 through k are assigned repetitively to positions within index table 44 starting with the link number 1 at the first entry position and thereafter repeating the link numbers 1 through k sequentially. In other embodiments of the present invention, the link numbers may be distributed in a non-repetitive and/or non-sequential manner. Still, in other embodiments of the present invention, additional logic may be included which redistributes the link numbers in index table 44 based on the amount of traffic through each link.

Looking at the last entry position having an address of $2^N-1$ where the link numbers have been assigned in a repetitive sequence, the last link assigned is $2^N$ mod k. As will be further shown, any links not included in the last repetitive sequence past link $2^N$ mod k are the least favored links. Alternatively, the links included in the last repetitive sequence including link $2^N$ mod k are the most favored links. Each of the least favored links will be assigned to one fewer entry position than the most favored links. The number of assignments of the least favored links can be determined as $x=\lfloor 2n/k \rfloor$ where x is the number of assignments of the least favored links.

It is typically preferable to create an index table 44 which is large enough that the ratio between assignments to the least favored links and assignments to the most favored links remains within a desired distribution boundary (DB). The ratio between assignments to the least favored links and assignments to the most favored links is represented by x/[x+1], where x is the number of assignments of the least favored links. The distribution boundary is related to the ratio between assignments by the equation [1−DB]≦x/[x+1]. To determine the size of the index table 44, the equation $\lfloor 2^N/k \rfloor/[1+\lfloor 2^N/k \rfloor] \geqq [1-DB]$ may be utilized to solve for N. While it is typically preferable that N be as great as possible in order to optimize the available bandwidth, the memory which may be available in host 22 or 24 for creating the index table must be accounted for in deciding a distribution boundary, and thereby determining N. Therefore, the distribution boundary is constrained by the memory which may be available in host 22 or 24 for a $2^N$ index table 44.

A complete index table 44 may be utilized to determine the distribution of data frames for transmission across the k links of the data aggregation. First, however, data frames with identical source addresses and destination addresses to other data frames are grouped as a flow. A particular set of N bits of the source address and destination address for each flow are XORed together to derive a random N bit table address number. Index table 44 is accessed with the random N bit table address number. The particular link at the address equivalent to the random N bit table address number is the link utilized to send the data flow across the link aggregation 40. It is desirable that the set of N bits of the source address and the destination address are taken from the middle portion of the address, however the N bits might be taken from any portion of the addresses and may or may not be contiguous.

Referring now to FIGS. 5, 6 and 7, while by the method described herein the number of links k and the number of bits N of the index table address may vary, for each of the examples illustrated, the number of links k remains constant with k=3 and the number of bits N is specified. The examples depict, for a constant number of links k where the k links are placed in a repetitive sequence in the index table, how by increasing the number of bits N of the index table address, the distribution boundary decreases.

With reference now to FIG. 5, there is depicted a pictorial illustration of a four entry position index table 50 where N=2 and where there are three links of the link aggregation 20 provided in accordance with the method and system of the present invention. As depicted at reference numeral 52, link 1 is assigned two times and links 2 and 3 are each assigned one time. The ratio between assignments of the least favored links (links 2 and 3) and the most favored link (link 1) is one-half. A ratio of one-half translates to a distribution boundary where there are 50 fewer flows assigned to the least favored link than the most favored link. It is typically not preferred that one link be assigned one-half of the flows while each of the other links is assigned one-fourth of the flows. By unequal distribution of flow assignments bandwidth is typically not optimized. Therefore, it is preferable that N be selected as a number which is greater than two when k is not a power of two in order that the bandwidth may be maximized and the distribution boundary decreased.

Referring now to FIG. 6, there is illustrated a pictorial illustration of an eight entry position index table 54 where N=3 and where there are three links of the links aggregation 20 provided in accordance with the method and system of the present invention. As depicted at reference numeral 56, links 1 and 2 are each assigned three times and link 3 is assigned two times. The ratio between the least favored link (link 3) and the most favored links (links 1 and 2) is two-thirds. A ratio of two-thirds translates to a distribution boundary where there are 33% fewer assignments to the least favored link than the most favored link. The result of increasing N from N=2 of FIG.5 to N=3 of the present FIG. 6 is a decrease in the distribution boundary from 50% to 33%.

Referring now to FIG. 7, it is desired that the distribution boundary is less than 10% where k=3. It is therefore necessary to solve for N such that $\lfloor 2^N/3 \rfloor/[1+\lfloor 2^N/3 \rfloor] \geqq [1-0.10]$. In solving the equation, N≧5 where k=3 to create a thirty-two entry position index table 58. With the links assigned to index table 58 as depicted at reference numeral 60, the ratio between least favored links and most favored links is ten-elevenths. The distribution boundary is such that there are less than 10% fewer least favored links. The result of increasing N from N=3 of FIG. 6 to N=5 of the present FIG. 7 is a reduction in the distribution boundary from 33% to less than 10%.

Upon reference to the foregoing those skilled in the art will appreciate that the applicants herein have provided a novel method and system whereby data is distributed for transmission across-a link aggregation in a balanced manner across a link aggregation where k is not a power of 2.

While the invention has been particularly shown and described with reference to a preferred embodiment, it will be understood by those skilled in the art that various changes in from and detail may be made therein without departing from the spirit and scope of the invention.

For example, although aspects of the present invention have been descibed with respect to a data distribution system executing software that directs the method of the present invention, it should be understood that the present invention may alternatively be implemented as a computer program product or data distribution system product for use with a computer system or data distribution system. Programs defining the functions of the present invention can be delivered to a computer system or data distribution system via a variety of signal-bearing media, which include, without limitation, non-writable storage media (e.g. CD-ROM), writable storage media (e.g. a floppy diskette or hard disk drive), and communication media, such as computer and telephone networks including ethernet. It should be understood, therefore, that such signal-bearing media, when carrying or encoding computer readable instructions that direct the method functions of the present invention, represent alternative embodiments of the present invention.

What is claimed is:

1. A method of balanced transmission of data across a link aggregation of k links in a network, where k is not a power of 2, where data is specified by frames each having a source address and a destination address, said method comprising the steps of:

determining N bits of said source address and N bits of said destination address to be XORed together where N is an integer greater than 2;

creating an index table with $2^N$ entry positions where each of said entry positions is assigned an index number between 0 and $2^N-1$;

filling said entry positions of said index table with an identification of one link of said k links in each said entry position by repetitively entering an identification of a sequential one of said k links until all of said entry positions are filled;

grouping frames of said data with identical source addresses and destination addresses as other frames into a flow;

XORing N bits of said source address together with N bits of said destination address for each said flow to obtain an N bit index number for each said flow;

accessing said index table with said N bit index number to identify a particular link within said index table; and transmitting said flow across said particular link of said link aggregation.

2. The method of balanced transmission of data across a link aggregation of k links in a network according to claim 1, wherein determining N bits of said source address and N bits of said destination address to be XORed together where N is greater than 2 further comprises the step of:

calculating N such that a desired percentage of fewer said entry positions filled by least favored links than filled by most favored links is maintained where said least favored links are filled into one fewer said entry position than said most favored links.

3. A system for balanced transmission of data across a link aggregation of k links in a network, where k is not a power of 2, where data is specified by frames each having a source address and a destination address, said system comprising:

means for determining N bits of said source address and N bits of said destination address to be XORed together where N is an integer greater than 2;

means for creating an index table with $2^N$ entry positions where each of said entry positions is assigned an index number between 0 and $2^N-1$;

means for filling said entry positions of said index table with an identification of one link of said k links in each said entry position by repetitively entering an identification of a sequential one of said k links until all of said entry positions are filled;

means for grouping frames of said data with identical source addresses and destination addresses as other frames into a flow;

means for XORing N bits of said source address together with N bits of said destination address for each said flow to obtain an N bit index number for each said flow;

means for accessing said index table with said N bit index number to identify a particular link within said index table; and means for transmitting said flow across said particular link of said link aggregation.

4. The system for balanced transmission of data across a link aggregation of k links in a network according to claim 3, wherein N is determined such that a desired percentage of fewer said entry positions filled by least favored links than filled by most favored links is maintained where a distribution boundary(DB) is said desired percentage to maintain, where said least favored links are filled into one fewer said entry position than said most favored links.

5. The system for balanced transmission of data across a link aggregation of k links in a network according to claim 3, wherein N is determined in accordance with the formula:

$$\lfloor 2^N/k \rfloor / [1+\lfloor 2^N/k \rfloor] \geq [1-DB]$$

where DB is the percentage of fewer said entry positions to be filled by least favored links than to be filled by most favored links.

6. The system for balanced transmission of data across a link aggregation of k links in a network according to claim 3, said system further comprising:

means for altering the identification of one link of said k links in each said entry position such that the identifications of links in entry positions are not sequential and not repetitive.

7. A program product usable by a system for balanced transmission of data across a link aggregation of k links in a network, where k is not a power of 2, where data is specified by frames each having a source address and a destination address comprising:

a flow transmission controller executable by said system for balanced transmission of data across a link aggregation, wherein in response to determining N bits of said source address and N bits of said destination address to be XORed together where N is an integer greater than 2, said flow transmission controller creates an index table with $2^N$ entry positions where each of said entry positions is assigned an index number between 0 and $2^N-1$, where said entry positions of said index table are filled with an identification of one link of said k links in each said entry position by repetitively entering an identification of a sequential one of said k links until all of said entry positions are filled, where frames of said data with identical source addresses and destination addresses as other frames are grouped into a flow, where N bits of said source address are XORed together with N bits of said destination address for each said flow to obtain an N bit index number for each said flow, where said index table is accessed with said N bit index number to identify a particular link within said index table, in order to control the transmission of said flow across said particular link of said link aggregation; and a signal-bearing media bearing said flow transmission controller.

8. The program product usable by a system for balanced transmission of data across a link aggregation of k links in a network according to claim 7 wherein for said flow transmission controller, N is determined such that a desired percentage of fewer said entry positions filled by least favored link than filled by most favored links is maintained where a distribution boundary(DB) is said desired percentage to maintain, where said least favored links are filled into one fewer said entry positions than said most favored links.

9. The program product usable by a system for balanced transmission of data across a link aggregation of k links in a network according to claim 7 wherein for said flow transmission controller, N is determined in accordance with the formula:

$$\lfloor 2^N/k \rfloor / [1+\lfloor 2^N/k \rfloor] \geq [1-DB]$$

where DB is the percentage of fewer said entry positions to be filled by least favored links than to be filled by most favored links.

10. The program product usable by a system for balanced transmission of data across a link aggregation of k links in a network according to claim 7, said flow transmission controller further comprising:

means for altering said identification of one link of said k links in each said entry position such that the identifications of links in entry positions are not sequential and not repetitive.

11. A method of balanced transmission of data across a link aggregation of k links in a network where k is not a power of 2, where data is specified by frames each having a source address and a destination address, said method comprising the steps of:

determining N bits of said source address and N bits of said destination address to be XORed together where N is an integer greater than 2, wherein determining N bits of said source address and N bits of said destination address includes calculating N such that a desired percentage of fewer said entry positions filled by least favored links than filled by most favored link is maintained where said least favored links are filled into one fewer said entry position than said most favored links;

creating an index table with $2^N$ entry positions where each of said entry positions is assigned an index number between 0 and $2^N-1$;

filling said entry positions of said index table with an identification of one link of said k links in each said entry position by repetitively entering an identification of a sequential one of said links until all of said entry positions are filled;

grouping frames of said data with identical source addresses and destination addresses as other frames into a flow;

XORing N bits of said source address together with N bits of said destination address for each said flow to obtain an N bit index number for each said flow;

accessing said index table with said N bit index number to identify a particular link within said index table; and transmitting said flow across said particular link of said link aggregation.

12. The method of balanced transmission of data across a link aggregation of k links in a network according to claim 11, wherein N is determined in accordance with the formula:

$$\lfloor 2^N/k \rfloor / [1+\lfloor 2^N/k \rfloor] \geq [1-DB]$$

where DB is the percentage of fewer said entry positions to be filled by least favored links than to be filled by most favored links.

13. The method of balanced transmission of data across a link aggregation of k links in a network according to claim 11, further comprising:

altering the identification of one link of said k links in each said entry position such that the identifications of links in entry positions are not sequential and not repetitive.

14. A system for balanced transmission of data across a link aggregation of k links in a network, where k is not a power of 2, where data is specified by frames each having a source address and a destination address, said system comprising:

means for determining N bits of said source address and N bits of said destination address to be XORed together where N is an integer greater than 2, wherein N is determined such that a desired percentage of fewer said entry positions filled by least favored links than filled by most favored links is maintained where a distribution boundary (DB) is said desired percentage to maintain, where said least favored links are filled into one fewer said entry position than said most favored links;

means for creating an index table with $2^N$ entry positions where each of said entry positions is assigned an index number between 0 and $2^N-1$;

means for filling said entry positions of said index table with an identification of one link of said k links in each said entry position by repetitively entering an identification of a sequential one of said k links until all of said entry positions are filled;

means for grouping frames of said data with identical source addresses and destination addresses as other frames into a flow;

means for XORing N bits of said source address together with N bits of said destination address for each said flow to obtain an N bit index number for each said flow;

means for accessing said index table with said N bit index number to identify a particular link within said index table; and means for transmitting said flow across said particular link of said link aggregation.

15. The system for balanced tranmission of data across a link aggregation of k links in a network according to claim 14, wherein N is determined in accordance with the formula:

$$\lfloor 2^N/k \rfloor / [1+\lfloor 2^N/k \rfloor] \geq [1-DB]$$

where DB is the percentage of fewer said entry positions to be filled by least favored links than to be filled by most favored links.

16. The system for balanced transmission of data across a link aggregation of k links in a network according to claim 14, said system further comprising:

means for altering the identification of one link of said k links in each said entry position such that the identifications of links in entry positions are not sequential and not repetitive.

17. A program product usable by a system for balanced transmission of data across a link aggregation of k links in a network, where k is not a power of 2, where data is specified by frames each having a source address and a destination address comprising:

a flow transmission controller executable by said system for balanced transmission of data across a link aggregation, wherein in response to determining N bits of said source and N bits of said destination address to be XORed together where N is an integer greater than 2, said flow transmission controller creates an index table with $2^N$ entry positions where each of said entry positions is assigned an index number between 0 and $2^N-1$, where said entry positions of said index table are filled with an identification of one link of said k links in each said entry position by repetitively entering an identification of a sequential one of said k links until all of said entry positions are filled, where frames of said data with identical source addresses and destination addresses as other frames are grouped into a flow, where N bits of said source address are XORed together with N bits of said destination address for each said flow to obtain an N bit index number for each said flow, where said index table is accessed with said N bit index number to identify a particular link within said index table, in order to control the transmission of said flow across said particular link of said link aggregation, wherein for said flow transmission controller, N is determined such that a desired percentage of fewer said entry positions filled by least favored link than filled by most favored links is maintained where a distribution boundary (DB) is said desired percentage to maintain, where said least favored links are filled into one fewer said entry positions than said most favored links; and a signal-bearing media bearing said flow transmission controller.

18. The program product usable by a system for balanced transmission of data across a link aggregation of k links in a network according to claim 17, wherein for said flow transmission controller, N is determined in accordance with the formula:

$$\lfloor 2^N/k \rfloor [1+\lfloor 2^N/k \rfloor] \geq [1-DB]$$

where DB is the percentage of fewer said entry positions to be filled by least favored links than to be filled by most favored links.

19. The program product usable by a system for balanced transmission of data across a link aggregation of k links in a network according to claim 17, said flow transmission controller further comprising:

means for altering said identification of one link of said k links in each said entry position such that the identifications of links in entry positions are not sequential and not repetitive.

* * * * *

UNITED STATES PATENT AND TRADEMARK OFFICE
CERTIFICATE OF CORRECTION

PATENT NO. : 6,512,742 B1 Page 1 of 1
DATED : January 28, 2003
INVENTOR(S) : Alexander, Jr. et al.

It is certified that error appears in the above-identified patent and that said Letters Patent is hereby corrected as shown below:

Column 9,
Line 2, please replace "said links" with -- said k links --.

Signed and Sealed this

First Day of July, 2003

JAMES E. ROGAN
*Director of the United States Patent and Trademark Office*